US009114529B2

(12) United States Patent
Wu et al.

(10) Patent No.: US 9,114,529 B2
(45) Date of Patent: Aug. 25, 2015

(54) DUAL-SYSTEM COMPONENT-BASED INDUSTRIAL ROBOT CONTROLLER

(71) Applicants: NANJING ESTUN ROBOTICS CO., LTD, Nanjing, Jiangsu (CN); NANJING ESTUN AUTOMATION CO., LTD, Nanjing, Jiangsu (CN)

(72) Inventors: Bo Wu, Nanjing (CN); Jiegao Wang, Nanjing (CN); Jihu Wang, Nanjing (CN); Jijun Yu, Nanjing (CN)

(73) Assignees: NANJING ESTUN ROBOTICS CO. LTD, Nanjing (CN); NANJING ESTUN AUTOMATION CO., LTD, Nanjing (CN)

( * ) Notice: Subject to any disclaimer, the term of this patent is extended or adjusted under 35 U.S.C. 154(b) by 69 days.

(21) Appl. No.: 14/116,453

(22) PCT Filed: Mar. 4, 2013

(86) PCT No.: PCT/CN2013/072139
§ 371 (c)(1),
(2) Date: Nov. 8, 2013

(87) PCT Pub. No.: WO2013/131457
PCT Pub. Date: Sep. 12, 2013

(65) Prior Publication Data
US 2014/0074294 A1    Mar. 13, 2014

(30) Foreign Application Priority Data
Mar. 8, 2012 (CN) .......................... 2012 1 0059639

(51) Int. Cl.
| G05B 19/00 | (2006.01) |
|---|---|
| B25J 9/16 | (2006.01) |
| G05B 19/414 | (2006.01) |

(52) U.S. Cl.
CPC .............. *B25J 9/161* (2013.01); *G05B 19/414* (2013.01)

(58) Field of Classification Search
CPC combination set(s) only.
See application file for complete search history.

(56) References Cited

U.S. PATENT DOCUMENTS

| 5,825,981 A | 10/1998 | Matsuda |
| 6,697,681 B1 * | 2/2004 | Stoddard et al. ................ 700/17 |

(Continued)

FOREIGN PATENT DOCUMENTS

| CN | 2447131 Y | 9/2001 |
| CN | 1424649 A | 6/2003 |

(Continued)

*Primary Examiner* — Jonathan L Sample
(74) *Attorney, Agent, or Firm* — Hudak, Shunk & Farine Co. LPA

(57) ABSTRACT

A dual system component-based industrial robot controller having a standard operating system, a real-time operating system, a route management module, a soft bus, a driver management module, a motion control module, a PLC module, an IO module, a teach pendent interface module and a protocol stack module. The controller employs a component-based structure and the components are operated respectively under a non real-time standard operating system and a real-time operating system, and supports distributed processing. The communications and function calls among the components are carried out by the route management module and the soft bus. The components in communication are managed through the route management module. The driver management module provides communications among other modules with a consistent interface which accords to the DS402 standard, and a servo driver that accords to this interface standard can be readily integrated into the controller. A user can develop function module components and add the same to the system, and the open-type interface of the controller enables the controller to connect hardware without limitations.

1 Claim, 1 Drawing Sheet

(56) References Cited

U.S. PATENT DOCUMENTS

| | | | |
|---|---|---|---|
| 6,928,337 B2 * | 8/2005 | Watanabe et al. | 700/245 |
| 2006/0100740 A1 * | 5/2006 | Sakiya et al. | 700/246 |
| 2006/0217037 A1 * | 9/2006 | Kalanovic | 451/5 |
| 2006/0287769 A1 * | 12/2006 | Yanagita et al. | 700/245 |
| 2007/0142967 A1 * | 6/2007 | Volcic et al. | 700/245 |
| 2008/0270920 A1 * | 10/2008 | Hudson | 715/763 |
| 2010/0017033 A1 * | 1/2010 | Boca | 700/258 |
| 2010/0217434 A1 * | 8/2010 | Hellberg et al. | 700/245 |
| 2010/0280663 A1 * | 11/2010 | Abdallah et al. | 700/264 |
| 2010/0305758 A1 * | 12/2010 | Nishi et al. | 700/264 |
| 2011/0153079 A1 | 6/2011 | Jung et al. | |
| 2012/0101613 A1 * | 4/2012 | Kapoor et al. | 700/97 |
| 2013/0096719 A1 * | 4/2013 | Sanders et al. | 700/264 |

FOREIGN PATENT DOCUMENTS

| | | |
|---|---|---|
| CN | 1912783 A | 2/2007 |
| CN | 101592951 A | 12/2009 |
| CN | 102126222 A | 7/2011 |
| CN | 102591306 A | 7/2012 |
| JP | 09 171405 A | 6/1997 |

* cited by examiner

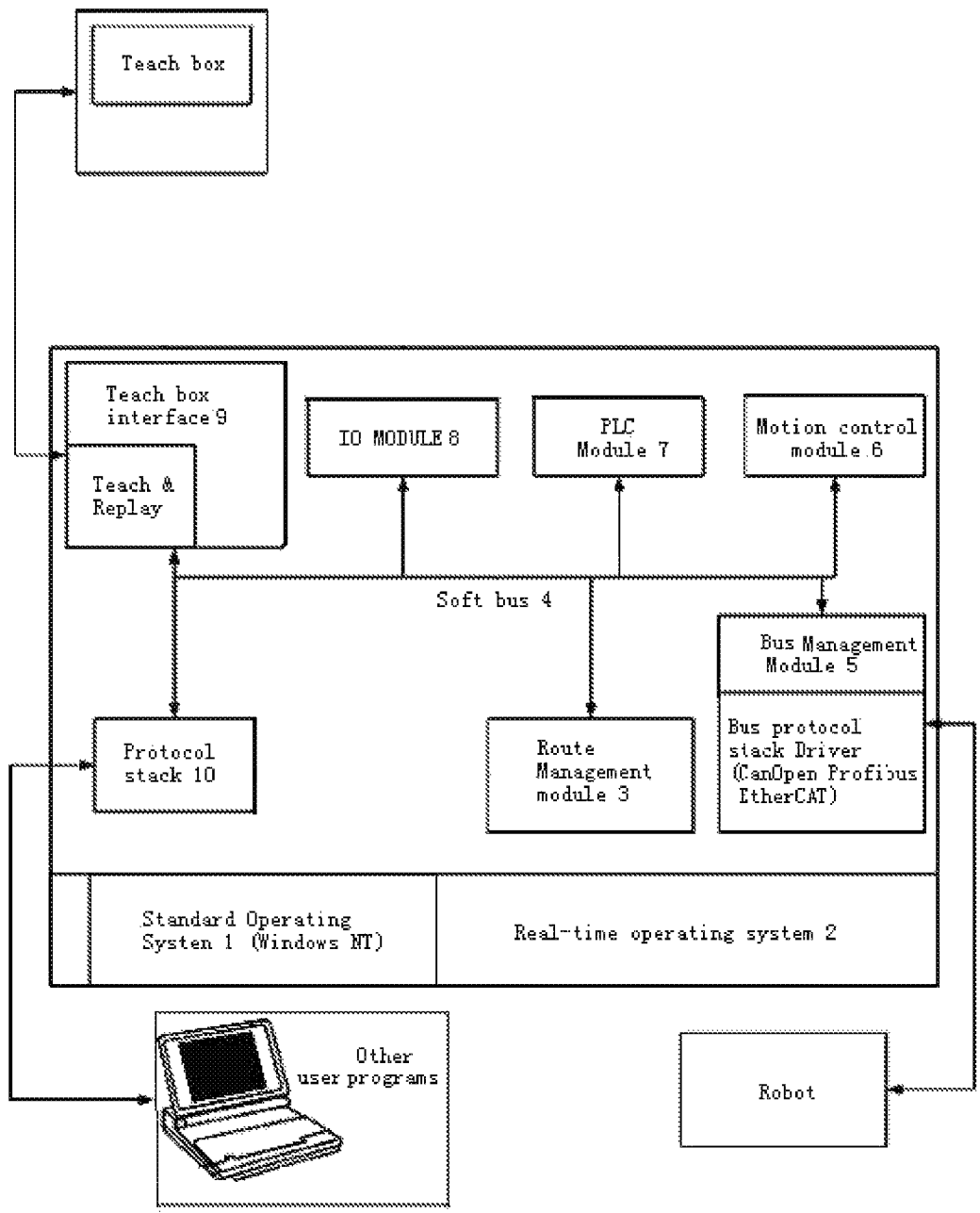

DUAL-SYSTEM COMPONENT-BASED INDUSTRIAL ROBOT CONTROLLER

TECHNICAL FIELD OF THE INVENTION

The present invention relates to an industrial robot controller. More specifically, the present invention relates to a dual system component-based industrial robot controller.

TECHNICAL BACKGROUND OF THE INVENTION

In the development history of robot controller, based on the control architecture, robot controllers can be classified into different categories, i.e. a robot controller can be in a single CPU structure, a centralized control architecture, a two-level CPU structure, a master-slave control architecture or a multiple CPU distributed control structure, etc. The first two structures were developed in the earlier stage of the development of computer technology, and they were realized by employing microprocessor units wherein the computing power of the CPU is not sufficiently powerful. The third structure generally applied the form of PC plus DSP-based motion control card (for example, PMAC card or Trio board card) which were respectively used to execute the upper computer programs and the motion control programs.

However, these solutions have some similar problems, i.e. their structures being relatively complicated, the programming being difficult, and the system computing power being weak, which bring difficulties in carrying out complicated calculations like dynamic control of a robot; the connection of the software and the hardware being relatively close; the wiring being complex, and the debugging and maintenance of the system being difficult, which result in an unreliable system. Furthermore, with the increase of targets to be controlled, the control of targets would become extremely difficult. Where a coordinated control of more axes is required, a significant adjustment of the entire structure would be needed, which would result in an increase of costs.

The latest open architecture is described, for example, in Chinese patent application CN1424649A titled "Open architecture robot controller". Although the open controllers were developed using a real-time system on a PC, such controllers are basically of an architecture having levels and each of the levels is employed to carry out a predetermined function. Where a new function is required, the architecture of the system is generally required to be modified and this is labor consuming.

SUMMARY OF THE INVENTION

The technical problem to be solved by the present invention is to overcome the flaws of the prior art, and provide a dual system component-based industrial robot controller. By employing the "component-based" structure and the base formed by a router manager and a soft bus for interconnection of the components, an open architecture is provided.

The dual system component-based industrial robot controller of the present invention comprises: a standard operating system, a real-time operating system, a route management module, a soft bus, a driver management module, a motion control module, a PLC module (programmable controller module), an IO module, a teach pendent interface module and a protocol stack module, characterized in that:

the standard operating system and the real-time operating system being the base platform for the operation of all of the component modules, the teach pendent interface module, the protocol stack module and the IO module being operated under the standard operating system, while the PLC module, the motion control module, the driver management module and the route management module being operated under the real-time operating system;

the soft bus being a customized Ethernet protocol which launches requests and communications among the modules using the net addresses and function IDs, the route management module and the soft bus working together to connect other real-time and non real-time operated modules;

the route management module being employed to perform message routing and control authority judgement between different function modules and maintain the public data source of the system, the function modules (i.e. the driver management module, the motion control module, the PLC module, the IO module, the teach pendent interface module and the protocol stack module) each having an interface that accords with the rules of the soft bus protocol, when interactions of the modules being required, the data being passed to the soft bus via the interfaces and finally arriving at the route management module, the route management module conducting an analysis on such requests and replies, and after judgement, corresponding data area being operated and the route management module sending orders or replies to the related modules;

the driver management module (bus management module) managing the fieldbus protocols, the low level thereof being various fieldbus board cards or the drivers of the protocol stack, the driver management module abstracting over the various fieldbus board cards or the drivers of the protocol stack, and providing therein a memory area for mapping the data abstracted from the buses, when access of other function modules to the devices connected to the fieldbus being required, the driver management module providing an identical abstract interface for the access and passing therein the access to the correct driver;

the motion control module performing trajectory planning and control of the robot, the motion control module being executed periodically, during each period, the motion control module reading the position data of the axes of the robot and calculating the new position command data with trajectory planning algorithm and updating the data, the data being maintained by the route management module and finally passed to the driver management module from which the data being passed to the corresponding hardware;

the IO module and the motion control module being operated at the same level and primarily for maintaining the IO data of the system and providing the high level programs with the IO information in the system; when the high level programs having access to the IO, they being passed to the route management module via the IO module, and then passed to driver management module by the route management module, and finally sent to the corresponding hardware via the driver;

the teach pendent interface module, the protocol stack module and the PLC module being operated at the same level and being the high level programs of the IO module and the motion control module, the PLC module being operated under the real-time system, while the teach pendent interface module, the protocol stack module being operated under the non real-time system.

The dual system component-based industrial robot controller of the present invention employs a component-based architecture. Thus, the controller is of an open-type structure which can be added with user-developed function module components according to predetermined rules. Furthermore, the open-type interface of the controller enables the controller to connect hardware without limitations.

BRIEF DESCRIPTION OF THE DRAWINGS

FIG. 1 is a schematic diagram of the structure of the dual system component-based industrial robot controller of the present invention.

DETAILED DESCRIPTION OF THE INVENTION

The present invention will be further described by referring to the drawing and the embodiment.

As shown in FIG. 1, The dual system component-based industrial robot controller of the present invention comprises: a standard operating system 1, a real-time operating system 2, a route management module 3, a soft bus 4, a driver management module 5, a motion control module 6, a PLC module 7, an IO module 8, a teach pendant interface module (including functions of teach & replay) 9, and a protocol stack module 10.

The standard operating system 1 and the real-time operating system 2 are the base platform for the operations of all of the component modules. The teach pendant interface module 9, the protocol stack module 10 and the IO module 8 are operated under the standard operating system 1, while the PLC module 7, the motion control module 6, the driver management module 5 and the route management module 3 are operated under the real-time operating system.

The soft bus 4 is a customized Ethernet protocol which launches requests and communications among the modules using the net addresses and function IDs. The route management module 3 is a manager in the system and it works along with the soft bus 4 to connect other real-time and non real-time operated modules.

The route management module 3 is employed to perform message routing and control authority judgement between different function modules and maintain the public data source of the system. In practice, the route management module 3 provides a shared memory area in the system memory for the saving of the global data. The accessible global data of different function modules are mapped to different corresponding memory sections, which represent the address spaces of various function modules. The data interactions and function calls among different function modules will be finalized as accesses to these global data, and all the accessions to these data will be judged and selected by the route management module 3. The function modules each have an interface that accords with the rules of the soft bus 4 protocol, and when interactions of the modules are required, the data is passed to the soft bus 4 via the interfaces and finally arrives at the route management module 3. The route management module 3 will conduct an analysis on such requests and replies, and after judgement, the corresponding data area will be operated and the route management module will send orders or replies to the related function modules.

The combination of the soft bus 4 and the route management module 3 enables the components to be distributed in different devices in a network, and when the components of different devices are in communication, the route management module will determine whether the component is a local component or a remote component. In case that the component is a remote component, the protocol data passed from the soft bus will be packed as an Ethernet data packet, and the data packet will the passed to the target device via the network devices.

The driver management module 5 manages the fieldbus and is in a relatively low level of the function modules. The lower level components of the driver management module 5 are various fieldbus board cards or drivers of the protocol stack, such as CanOpen, EtherCAT and ProfiDrive, etc. The driver management module 5 abstracts over the drivers, and provides therein a memory area for mapping the data abstracted from the buses. When an access of other function modules (for example, the IO module 8 or the motion control module 6) to the devices (for example, an IO slave station or a server) connected to the fieldbus is required, the driver management module 5 will provide an identical abstract interface for the access to different fieldbuses and pass therein the access to the correct driver.

The motion control module 6 performs trajectory planning and control of the robot. The motion control module is executed periodically, during each period, the motion control module 6 reads the position data of the axes of the robot and calculates the new position command data in accordance with a corresponding algorithm, and then updates the data. The data is maintained by the route management module 3 and finally passed to the driver management module 5 from which the data is passed to the corresponding hardware.

The IO module 8 and the motion control module 6 are operated at the same level and primarily for maintaining the IO data of the system, and provide the high level programs with the IO information in the system; when the high level programs have access to the IO, it is passed to the route management module 3 via the IO module 8, and then passed to driver management module 5 by the route management module 3, and finally passed to the corresponding hardware via the driver.

The teach pendent interface module 9, the protocol stack 10 and the PLC module 7 are operated at the same level and are the high level programs of the IO module 8 and the motion control module 6 and implement accesses to these low level module functions. The PLC module 7 is operated under the real-time system, while the teach pendent interface module 9 and the protocol stack module 10 are operated under the non real-time system.

This component-based design controller makes the functions of the controller not limited to those as described above. A user can develop function module components and add the same to the controller according to predetermined rules. Furthermore, the open-type interface of the controller enables the controller to connect hardware without limitations.

What is claimed is:

1. A dual system component-based industrial robot controller of the present invention comprises: a standard operating system, a real-time operating system, a route management module, a soft bus, a driver management module, a motion control module, a PLC module, an IO module, a teach pendent interface module and a protocol stack module, wherein
   the standard operating system and the real-time operating system being a base platform for the operation of all of the component modules, the teach pendent interface module, the protocol stack module and the IO module being operated under the standard operating system, while the PLC module, the motion control module, the driver management module and the route management module being operated under the real-time operating system;
   the soft bus being a customized Ethernet protocol which launches requests and communications among the modules using net addresses and function IDs, the route management module and the soft bus working together to connect other real-time and non real-time operated modules;

the route management module being employed to perform message routing and control authority judgement between different function modules and maintain a public data source of the system, wherein function modules comprising the driver management module, the motion control module, the PLC module, the IO module, the teach pendent interface module and the protocol stack module each having an interface that accords with the rules of the soft bus protocol, when interactions of the modules being required, the data being passed to the soft bus via the interfaces and finally arriving at the route management module, the route management module conducting an analysis on such requests and replies, and after judgement, corresponding data area being operated and the route management module sending orders or replies to the related modules;

the driver management module (bus management module) managing a fieldbus, a low level thereof being various fieldbus board cards or drivers of the protocol stack, the driver management module abstracting over the various fieldbus board cards or the drivers of the protocol stack, and providing therein a memory area for mapping the data abstracted from the buses, when access of other function modules to the devices connected to the fieldbus being required, the driver management module providing an identical abstract interface for the access and passing therein the access to the correct driver;

the motion control module performing trajectory planning and control of the robot, the motion control module being executed periodically, during each period, the motion control module reading the position data of the axes of the robot and calculating a new position command data with trajectory planning algorithm and updating the data, the data being maintained by the route management module and finally passed to the driver management module from which the data being passed to the corresponding hardware;

the IO module and the motion control module being operated at the same level primarily for maintaining IO data of the system and providing high level programs with common existing access to the IO data in the system; when the high level programs having access to the IO, they being passed to the route management module via the IO module, and then passed to driver management module by the route management module, and finally sent to the corresponding hardware via the driver;

the teach pendent interface module, the protocol stack module and the PLC module being operated at the same level and being the high level programs of the IO module and the motion control module, the PLC module being operated under the real-time system, while the teach pendent interface module, the protocol stack module being operated under non the real-time system.

* * * * *